United States Patent [19]
Okada et al.

[11] Patent Number: 5,091,135
[45] Date of Patent: Feb. 25, 1992

[54] IMPROVEMENTS IN THE ENCAPSULATION OF ELECTRONIC COMPONENTS EMPLOYING LOW STRESS ENCAPSULANT COMPOSITION

[75] Inventors: Tsuneyoshi Okada, Kawasaki; Toshikatsu Nitoh, Fuji; Toshio Kanoe, Osaka; Masato Togami, Fuji, all of Japan

[73] Assignee: Polyplastic Co., Ltd., Osaka, Japan

[21] Appl. No.: 420,948

[22] Filed: Oct. 13, 1989

Related U.S. Application Data

[62] Division of Ser. No. 235,248, Aug. 23, 1988, abandoned.

[30] Foreign Application Priority Data

Sep. 11, 1987 [JP] Japan ................................ 62-227776
Feb. 2, 1988 [JP] Japan ................................ 63-22614

[51] Int. Cl.$^5$ ............................................. B29C 45/14
[52] U.S. Cl. ........................ 264/272.13; 264/272.11; 264/272.17; 264/328.18; 264/331.21
[58] Field of Search ............... 264/272.11, 272.13, 264/272.17, 328.1, 328.18, 331.21

[56] References Cited

U.S. PATENT DOCUMENTS 4,632,798 12/1986 Eickman et al. ............... 264/272.13
4,719,171 1/1988 Ikenaga et al. ................... 428/1

FOREIGN PATENT DOCUMENTS 61-69866 of 1986 Japan .

Primary Examiner—James Lowe
Attorney, Agent, or Firm—Burns, Doane, Swecker & Mathis

[57] ABSTRACT

An improved method for encapsulating an electronic component with a highly stable protective layer is provided. Such encapsulation is carried out by injection molding about the surface of the electronic component of an encapsulant composition comprising a molten melt-processable polyester which is capable of forming an anisotropic melt phase having uniformly blended therein about 0.1 to 30 percent by weight based upon the total weight of the composition of silicone oil and/or a silicone rubber. Quality encapsulation is made possible under conditions wherein damage to the electronic component is minimized, and the resulting product is well protected without damage under a wide variety of end use conditions including variations in temperature. The process is carried out in the substantial absence of deleterious mold shrinkage and the product exhibits an extremely low linear coefficient of thermal expansion which well protects the electronic component encased therein.

18 Claims, No Drawings 5,091,135

IMPROVEMENTS IN THE ENCAPSULATION OF ELECTRONIC COMPONENTS EMPLOYING LOW STRESS ENCAPSULANT COMPOSITION

This application is a divisional of application Ser. No. 235,248, filed Aug. 23, 1988 (now abandoned).

The invention relates to a low stress encapsulant or sealant comprising a polyester which is capable of forming the anisotropic phase in the molten state and melt-processable and a silicone uniformly blended therewith. The invention is directed to use of the above shown composition comprising the polyester and the silicone for an encapsulant or sealant to encapsulate or seal various parts of electric appliances.

STATEMENT OF PRIOR ARTS

IC's, transistors, diodes, coils, capacitors, resistors, connectors, LSI's, etc. are sealed with a synthetic resin in order to maintain their electrical insulating property, to protect them from an external force and to prevent changes in their characteristics due to a surrounding atmosphere. Mainly epoxy resins are employed at present as the synthetic resin for the above-described purposes, since they are advantageous in that the shrinkage and expansion thereof in the molding and curing stages are only slight and that, in addition, the cured products thereof are chemically inert so that they undergo only slight deformation due to temperature or humidity changes and have only a low hygroscopicity.

Recently, however, additional properties are further demanded because a higher performance is required of the sealed articles and the service conditions are being changed.

In particular, a demand for reduction in the strain and stress of a resin used for sealing IC's raises serious problems in accordance with a recent trend toward a higher degree of integration and a larger size of IC's. It is thus demanded to minimize demages to the IC's caused by a stress occurring therein. In the actual use of sealed IC's, meanwhile, it is eagerly demanded that no stress occurs in not only the sealing compound itself but also the sealed IC's even when the temperature changes abruptly, since the sealed IC's are brought into direct contact with a molten solder bath in a surface mounting technique. However, no sealing compound which satisfies these requirements has been found yet.

SUMMARY OF THE INVENTION

After intensive investigations made for the purpose of developing a sealing material having excellent properties by solving the above-described problems, the inventors found that a melt-processable polyester capable of forming an anisotropic molten phase (hereinafter referred to as liquid crystal polyester) had excellent properties such as a low coefficient of linear expansion, low molding shrinkage and low modulus of elasticity and, therefore, it might be usable as a quite suitable sealing compound. However, it was found also that even the liquid crystal polyester was unsatisfactory for solving the recent problems. After further intensive investigations, the inventors have found that a sealing compound having a remarkably reduced stress can be produced by incorporating a silicone in the liquid crystal polyester. The present invention has been completed on the basis of this finding.

Thus the present invention provides a low-stress sealing compound characterized by comprising a melt-processable polyester capable of forming an anisotropic molten phase and a silicone incorporated therein.

The term "liquid crystal polyester" as used herein refers to a melt-processable polyester having such a property that when it is molten, the molecular chains thereof are regularly arranged in parallel. Such an arrangement of the molecules is often called a liquid crystal state or a nematic phase of a liquid crystal substance. Such a polymer molecule is generally slender and flat. It has a considerably high rigidity along the major axis of the molecule. Usually the polymer molecules have chain-extending bonds which are arranged either coaxially or in parallel.

The properties of the anisotropic molten phase can be examined by an ordinary polariscopic method using crossed nicols. In particular, the anisotropic molten phase can be recognized by placing a molten sample on a Leitz's hot stage of a Leitz polarizing microscope and observing it at a magnification of 40 in a nitrogen atmosphere. The polymer is optically anisotropic. Namely, it transmits light in the examination thereof between crossed nicols. When the sample is optically anisotropic, the polarized light passes through it even in a static state.

The constituent(s) of the polymer capable of forming the above-mentioned anisotropic molten phase is(are) selected from the following compounds:

(1) one or more of aromatic dicarboxylic acids and alicyclic dicarboxylic acids, (2) one or more of aromatic diols, alicyclic diols and aliphatic diols, (3) one or more of aromatic hydroxycarboxylic acids, (4) one or more of aromatic thiolcarboxylic acids, (5) one or more of aromatic dithiols and aromatic thiolphenols, and (6) one or more of aromatic hydroxyamines and aromatic diamines.

The polymers capable of forming the anisotropic molten phase are those comprising the following combinations:

I) a polyester comprising (1) and (2),
II) a polyester comprising only (3),
III) a polyester comprising (1), (2) and (3),
IV) a polythiol ester comprising only (4),
V) a polythiol ester comprising (1) and (5),
VI) a polythiol ester comprising (1), (4) and (5),
VII) a polyester amide comprising (1), (3) and (6), and
VIII) a polyester amide comprising (1), (2), (3) and (6).

The polymers capable of forming the anisotropic molten phase include, in addition to the above-mentioned combinations, aromatic polyazomethines such as poly(nitrilo-2-methyl-1,4-phenylenenitriloethylidyne-1,4-phenyleneethylidynel), poly(nitilo-2-methyl-1,4-phenylenenitrilomethylidyne-1,4-phenylenemethylidyne) and poly(nitrilo-2-chloro-1,4-phenylenenitrilomethylidyne-1,4-phenylenemethylidyne).

The polymers capable of forming the anisotropic molten phase include, in addition to the above-mentioned combinations, polyester carbonates. They include those essentially comprising 4-hydroxybenzoyl, dihydroxyphenyl, dihydroxycarbonyl or terephthalyl units.

The polyesters I), II) and III) and polyester amide VIII) usable in the present invention for forming the anisotropic molten phase can be prepared by various esterification processes wherein organic monomers having a functional group capable of forming an intended recurring unit by condensation are reacted with each other. The functional groups of the organic monomers are, for example, carboxyl, hydroxyl, ester, acyloxy, acyl halide and amine groups. The organic monomers can be reacted by a melt acidolysis process in the absence of any heat exchange fluid. In this process, the monomers are heated together to form a melt of the reactants. As the reaction proceeds, a suspension of solid polymer particles appears in the solution. The reaction can be conducted in a vacuum in order to facilitate the removal of volatile matters (such as acetic acid or water) formed as the by-product, in the final stage of the condensation reaction.

Further a slurry polymerization process can be employed for forming the liquid crystal polyester suitable for use in the present invention. In this process, the solid product is obtained in the form of a suspension thereof in a heat exchange medium.

In both of the melt acidolysis and slurry polymerization processes, the organic monomers used as the starting materials for the liquid crystal polyester can be used in their modified form prepared by esterifying the hydroxyl groups (namely in the form of lower acyl esters). The lower acyl groups are preferably those having about 2 to 4 carbon atoms. Preferably the organic monomeric reactants are subjected to the reaction in the form of acetates.

Typical examples of the catalysts usable in both the melt acidolysis and slurry processes include dialkyltin oxides (such as dibutyltin oxide), diaryltin oxides, titanium dioxide, antimony trioxide, alkoxytitanium silicates, titanium alkoxides, alkali metal salts and alkaline earth metal salts of carboxylic acids (such as zinc acetate), Lewis acids (such as $BF_3$), and gaseous acid catalysts such as hydrogen halides (e.g. HCl). The amount of the catalyst is about 0.001 to 1 wt. %, particularly preferably 0.01 to 0.2 wt. %, based on the total amounts of the monomers.

The liquid crystal polymers suitably used in the present invention are generally substantially insoluble in ordinary solvents and, therefore, they are unsuitable for solution processing. However, these polymers can be easily processed by an ordinary melt processing process. A particularly preferred liquid crystal polymer is one slightly soluble in pentafluorophenol.

The liquid crystal polyesters suitably used in the present invention have a weight-average molecular weight of usually about 1,000 to 200,000, preferably about 5,000 to 50,000 and particularly preferably about 10,000 to 25,000. Preferred wholly aromatic polyester amides have a molecular weight of usually about 1,000 to 50,000, preferably about 5,000 to 30,000, for example, 15,000 to 17,000. The molecular weight can be determined by gel permeation chromatography or a standard determination method which does not involve the formation of a polymer solution, such as a method of determining a terminal group of a compression-molded film by infrared spectrometry. Further the molecular weight can be determined by light scattering after dissolving the polymer in pentafluorophenol.

A 0.1 wt. % solution of the above-described liquid crystal polyester or polyester amide in pentafluorophenol prepared at 60° C. has a inherent vicosity number (I.V.) of at least about 1.0 dl/g, for example, about 2.0 to 10.0 dl/g.

The polymers capable of forming the anisotropic molten phase and usable in the present invention are preferably aromatic polyesters and aromatic polyester amides. Polyesters comprising an aromatic polyester and an aromatic polyester amide partially in the same molecular chain are also preferred.

Preferred examples of the compounds usable as the constituents of the polymers include naphthalene compounds such as 2,6-naphthalenedicarboxylic acid, 2,6-dihydroxynaphthalene, 1,4-dihydroxynaphthalene and 6-hydroxy-2-naphthoic acid; biphenyl compounds such as 4,4'-diphenyldicarboxylic acid and 4,4'-dihydroxybiphenyl; compounds represented by the following general formulae (I), (II) and (III):

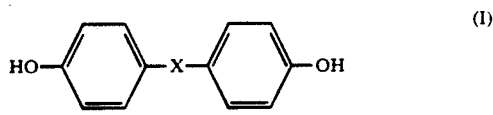

(I)

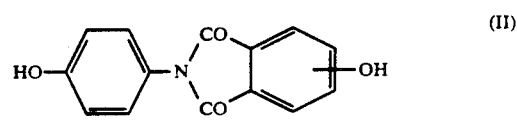

(II)

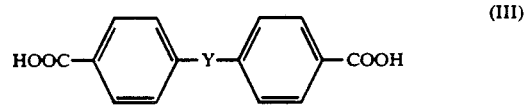

(III)

wherein X represents an alkylene group having 1 to 4 carbon atoms, an alkylidene group, —O—, —SO—, —SO$_2$—, —S— or —CO—, and Y represents —(CH$_2$)$_n$— in which n is 1 to 4 or —O(CH$_2$)$_n$O— in which n is 1 to 4, benzene compounds having substituents at p-positions thereof, such as p-hydroxybenzoic acid, terephthalic acid, hydroquinone, p-aminophenol and p-phenylenediamine and corresponding benzene compounds having a substituent in the nucleus (the substituent being selected from the group consisting of chlorine, bromine, methyl, phenyl and 1-phenylethyl); and benzene compounds having substituents at m-positions thereof, such as isophthalic acid and resorcinol.

The liquid crystal polyesters used in the present invention may partially contain a polyalkylene terephthalate incapable of forming the anisotropic molten phase in the same molecular chain in addition to the above-described constituents. The alkyl group of the polyalkylene terephthalate has 2 to 4 carbon atoms.

Among the liquid crystal polyesters comprising the above-described constituents, particularly preferred are those containing one or more compounds selected from the group consisting of the naphthalene compounds, biphenyl compounds and benzene compounds having a substituent at p-position as the indispensable constituent(s). Among the benzene compounds having substituents at p-positions, particularly preferred are p-hydroxybenzoic acid, methylhydroquinone and 1-phenylethylhydroquinone.

Particularly preferred polyesters capable of forming the anisotropic molten phase and usable in the present invention are those containing at least 10 molar % of a naphthalene moiety-containing recurring unit such as 6-hydroxy-2-naphthoyl, 2,6-dihydroxynaphthalene or 2,6-dicarboxynaphthalene. Preferred polyester amides are those having a recurring unit comprising the above-described naphthalene moiety and 4-aminophenol or 1,4-phenylenediamine.

Examples of the compounds usable as the constituents of the above-described polymers I) to VIII) and those of the polyesters capable of forming the anisotropic molten phase and preferably used in the present invention are described in Japanese Patent Laid-Open No. 69866/1986.

Other thermoplastic resins can be incorporated in the liquid crystal polyester of the present invention within the scope of the present invention so far as the object of the present invention is not disturbed.

The thermoplastic resins used for this purpose are not particularly limited. They include, for example, polyolefins such as polyethylene and Polypropylene; aromatic polyesters comprising a hydroxycarboxylic acid or an aromatic dicarboxylic acid and a diol, such as polyethylene terephthalate and polybutylene terephthalate; polyacetals (homopolymers and copolymers), polystyrene, polyvinyl chloride, polyamides, polycarbonates, ABS, polyphenylene oxides, polyphenylene sulfides and fluororesins. These thermoplastic resins can be used either singly or in the form of a mixture of two or more of them.

The liquid crystal polyester has a high strength and a high self-reinforcing effect owing to its unique molecular configuration. It has also a low coefficient of linear expansion and a low mold shrinkage factor and, therefore, a high dimensional stability. Further, the liquid crystal polyester has a low melt viscosity, a high fluidity and a resistance to a temperature as high as 220° to 240° C. In addition, it has high chemical resistance, weather resistance and hot-water resistance as well as a quite high chemical stability. It exerts no influence on other materials. The liquid crystal polyester is thus suitable for use as the sealing compound.

According to the present invention, a silicone is incorporated in the liquid crystal polyester in order to further improve the performance thereof while maintaining the characteristics thereof.

The silicones usable in the present invention are organopolysiloxane compounds. They may be silicone oils, silicone rubbers, silicone resins and modifications thereof. They can be used either singly or in the form of a combination of two or more of them.

The silicone oil mainly comprises a straight-chain or partially branched dimethylpolysiloxane having a relatively low degree of polymerization. It may have a hydrogen atom or an alkyl, aryl, halogenated alkyl, halogenated aryl, amino-modified alkyl, mercapto-modified alkyl, epoxy-modified alkyl or carboxyl-modified alkyl group bound to a part of the methyl groups and/or at least a part of the main chain terminals. Further it may be substituted with one or more of polyether-modified compounds, alcohol-modified compounds and ester-modified compounds.

The silicone oil usable in the present invention has a viscosity in the range of 0.5 to 1,000,000 cSt, preferably 500 to 600,000 cSt. From the viewpoints of the workability in the extrusion and molding stages and inhibition of exudation from the molded resin, the viscosity is particularly preferably in the range of 1,000 to 100,000.

The silicone rubbers include millable ones prepared by kneading an organopolysiloxane having a high degree of polymerization together with an inorganic filler and a hardener and heat-curing the product to crosslink it, and ones prepared by crosslinking at least one of organopolysiloxanes having a reactive group by heating or irradiation with U.V. rays in the presence of a catalyst. The siloxanes having the reactive group at an end of the main chain or in a side chain include those having at least one group of the formula:

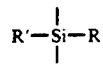

wherein the reactive groups R and R' each represent H, OH, OR,

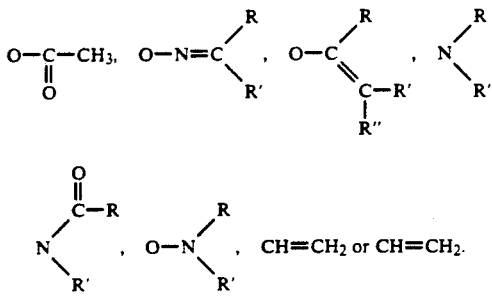

From the viewpoint of the reaction mechanism, the silicone rubbers can be classified into three groups, i.e. those of condensation type, addition type and radical type. The silicone rubbers of the condensation type are those crosslinked by the condensation between silanols with elimination of water, the condensation between a silanol and an alkoxysiloxane with elimination of alcohol, or the condensation between

and a silanol with elimination of hydrogen in the presence of an acidic or basic substance or a metal catalyst such as tin. The silicone rubbers of the addition type are those crosslinked by hydrosilylation between an unsaturated group such as a vinyl group and

in the presence of a platinum compound. The silicone rubbers of the radical type are those crosslinked by irradiation with U.V. rays, recombination of radicals formed by using a radical-forming agent or addition reaction. The silicone rubber of the addition type is particularly preferred in the present invention, since it is in the form of a highly pure powder. The average particle diameter of the powdery silicone rubber is preferably 0.1 to 100 μm, particularly 1 to 20 μm.

The dimethylpolysiloxane as the main component may have a hydrogen atom or an alkyl, aryl, halogenated alkyl, halogenated aryl, amino-modified alkyl, mercapto-modified alkyl, epoxy-modified alkyl or carboxyl-modified alkyl group bound to a part of its side chains such as methyl groups and/or at least a part of the main chain terminals. Further it may be substituted with one or more of polyether-modified compounds, alcohol-modified compounds and ester-modified compounds.

The silicone resins are polyorganosiloxanes having a three-dimensional, highly developed network. The methylpolysiloxane as the main component thereof may have a hydrogen atom or an alkyl, aryl, halogenated alkyl, halogenated aryl, amino-modified alkyl, mercapto-modified alkyl, epoxy-modified alkyl or carboxyl-modified alkyl group bound to a part of its side chains such as methyl groups and/or at least a part of the main chain terminals, or it may be substituted with one or more of polyether-modified compounds, alcohol-modified compounds and ester-modified compounds.

In the present invention, also the silicone resin is preferably in the form of a powder having an average particle diameter of 0.1 to 100 μm, particularly 1 to 20 μm.

The amount of the silicone in the present invention is 0.1 to 30 wt. % based on the total amount of the composition. More particularly, the amount of the silicone oil is preferably 0.1 to 5 wt. %, more preferably 0.5 to 2 wt. %, that of the silicone rubber is preferably 1 to 20 wt. %, more preferably 2 to 15 wt. %, and that of the silicone resin is preferably 1 to 20 wt. %.

In the sealing compound of the present invention, it is unnecessary to harden the silicone per se or to react the silicone with the liquid crystal polyester. Therefore, the silicone is preferably chemically inert. In this connection, it is preferred that when the silicone is mixed with the liquid crystal polyester, a heterogeneous mixture having a so-called island-sea-type structure is obtained.

It is possible and preferable to incorporate an inorganic filler in the sealing compound of the present invention.

The inorganic filler is particularly preferably a heat-conductive one. The heat-conductive inorganic filler is usually selected from the group consisting of metal oxides, metal nitrides and metal carbides having a thermal conductivity of a least 10 W/m.K at 300° K. They include, for example, beryllium oxide, magnesium oxide, aluminum oxide, thorium oxide, zinc oxide, silicon nitride, boron nitride, aluminum nitride, silicon carbide and silicon oxide. Among them, silicon oxide, particularly fused silica, is preferred.

The inorganic filler is preferably in the form of a powder having an average particle diameter of 1 to 100 μm, more preferably 10 to 70 μm.

The amount of the inorganic filler used is preferably such that the composition thus formed will have a coefficient of linear expansion equal to that of an electric component to be sealed and also that an intended thermal conductivity will be obtained. When the sealing compound is used for sealing components comprising an inorganic substance, such as IC's, the amount of the filler is preferably at least 20 wt. %, more preferably at least 30 wt. % and particularly preferably 40 to 75 wt. %, based on the total amount of the composition.

The inorganic filler can be used in the present invention in combination with a well-known surface treatment depending on desired physical properties. The surface treatments are functional compounds such as epoxy compounds, isocyanate compounds, titanate compounds and silane compounds. These compounds may be used for the pretreatment of the surface or they may be incorporated in the mixture of the starting materials.

The sealing compound of the present invention may contain, in addition to the above-described components, ordinary additives such as inorganic fillers, dyes, pigments, release agents, antioxidants, heat stabilizers, reinforcing agents and hydrolysis stabilizers. Various epoxy resins are preferably used as the stabilizer.

The thermoplastic, low-stress sealing compound of the present invention has high thermal resistance and heat shock resistance and it is free of a problem that the electronic components are attacked by the catalyst or impurities contained in the resin unlike the sealing epoxy resin.

The coefficient of linear expansion of the liquid crystal polyester is lower than that of epoxy resin and close to that of silicone chips favorably. Particularly the liquid crystal polyester containing a filler such as a glass fiber or an inorganic powder has a low anisotropy and, therefore, its coefficient of linear expansion is the same in all directions irrespective of the direction of the flow of the resin in the molding stage. Accordingly, it will suffice when the sealing compound absorbs only the expansion and shrinkage of the sealed materials. The stress can be thus reduced by the mere addition of a small amount of the silicone. Another advantage is that the reduction in the strength can be minimized.

EXAMPLES

The following Examples will further illustrate the present invention, which by no means limit the invention.

Examples 1 to 7

44 wt. % of one of liquid crystal polyester resins A to G was mixed with 44 wt. % of fused silica having an average particle diameter of 20 μm and 12 wt. % of silicone rubber A. The mixture was pelletized by an ordinary method with an ordinary extrusion molding machine at 280° C. The pellets were used for sealing a DIP-type 14-pin IC by the so-called insert injection molding method. The temperature of the cylinder of the molding machine was 300° C. The results are shown in Table 1.

The silicone rubber A used herein was a powdery silicone rubber having an average particle diameter of 8 μm prepared by subjecting a dimethylpolysiloxane having vinyl groups at both ends and a dimethylpolysiloxane having

partially in its chain to addition reaction in the presence of a platinum compound catalyst to obtain a crosslinked product.

Comparative Example 1

The IC was sealed in the same manner as that of Example 5 except that only the liquid crystal polyester E was used. The results are shown in Table 1.

Comparative Example 2

The IC was sealed in the same manner as that of Example 5 except that a sealing epoxy resin was used. The results are shown in Table 1.

TABLE 1

|  | Example | | | | | | | Comparative Example | |
|---|---|---|---|---|---|---|---|---|---|
|  | 1 | 2 | 3 | 4 | 5 | 6 | 7 | 1 | 2 |
| Resin used | A | B | C | D | E | F | G | E | epoxy resin |
| Water absorption *1 (%) | 0.09 | 0.08 | 0.10 | 0.09 | 0.15 | 0.24 | 0.28 | 0.30 | 0.9 |
| Volume resistivity after absorption of water ($\times 10^{15} \Omega$) | 8 | 9 | 6 | 7 | 8 | 6 | 9 | 8 | 0.7 |
| Stress after molding (strain gauge) | 600 | 500 | 700 | 750 | 600 | 700 | 600 | 800 | 1000 |
| Heat shock test *2 (number of cracks/ number of specimens) | 0/20 | 0/20 | 0/20 | 0/20 | 0/20 | 0/20 | 0/20 | 1/20 | 3/20 |
| Coefficient of linear expansion ($\times 10^{-5}$ cm/cm/°C.) | 0.8 | 0.9 | 0.7 | 0.6 | 0.8 | 0.9 | 0.9 | 0.8 | 1.5 |
| Young's modulus in flexure (kgf/mm$^2$) | 900 | 1000 | 950 | 930 | 800 | 900 | 820 | 900 | 1250 |

(Notes)
*1 The water absorption was determined under conditions comprising 133° C., 100% RH and 100 h.
*2 The heat shock test was conducted at −65° C. for 5 min. and then at 150° C. for 5 min.; 300 cycles.

Examples 8 to 12 and Comparative Examples 3 and 4

Pellets each having a composition shown in Table 2 were prepared from the liquid crystal polyester resin E in the same manner as that of Example 5 and then a DIP-type 14-pin IC was sealed therewith.

The silicone oils used herein were as follows:
Silicone oil A:
dimethylpolysiloxane having a viscosity of 10,000 cSt
Silicone oil B:
dimethylpolysiloxane having a viscosity of 100,000 cSt, and
Silicone oil C:
Amino-modified silicone oil having an aminoalkyl group in a side chain of dimethylpolysiloxane (amino equivalent: 2,000) and having a viscosity of 3,500 cSt.

The ink immersion test conducted for the evaluation of the products was as follows: the IC was immersed in a fluorescent ink (PEP fluorescent penetrating fluid F-6A-SP; a product of Eishin Kagaku Co., Ltd.) at room temperature for 1 h to examine the extent of adhesion between the metallic lead frame and the resin from the amount of penetration of the ink into an interface between the frame and the resin. The number of the specimens in which the penetration was observed in 100 specimens is shown in Table 2.

The IC was sealed in the same manner as that of Examples 8 to 12 except that no silicone oil was used. The results are also shown in Table 2.

TABLE 2

|  | Example | | | | | Comparative Example | |
|---|---|---|---|---|---|---|---|
|  | 8 | 9 | 10 | 11 | 12 | 3 | 4 |
| Resin used (wt. %) | 34.5 | 34.0 | 33.0 | 33.0 | 33.0 | 50 | 35 |
| Silica (wt. %) | 65.0 | 65.0 | 65.0 | 65.0 | 65.0 | 50 | 65 |
| Silicone oil A (wt. %) | — | — | — | 2.0 | — | — | — |
| Silicone oil B (wt. %) | 0.5 | 1.0 | 2.0 | — | — | — | — |
| Silicone oil C (wt. %) | — | — | — | — | 2.0 | — | — |
| Heat shock test (number of cracks/number of specimens) | 1/100 | 0/100 | 0/100 | 0/100 | 0/100 | 3/100 | 3/100 |
| Young's modulus in flexure (kgf/mm$^2$) | 860 | 820 | 720 | 720 | 720 | 950 | 1050 |
| Coefficient of linear expansion ($\times 10^{-5}$ cm/cm/°C.) | 1.3 | 1.2 | 1.2 | 1.2 | 1.1 | 1.5 | 1.0 |
| Ink immersion test | 0/100 | 0/100 | 0/100 | 0/100 | 0/100 | 10/100 | 7/100 |

Examples 13 to 17

Pellets each having a composition shown in Table 3 were prepared from the liquid crystal polyester resin E in the same manner as that of Example 5 and then a DIP-type 14-pin IC was sealed therewith.

The silicone rubbers used herein were as follows:
Silicone rubber A:
the same as that used in Example 1, and
Silicone rubber B:
mercapto-modified silicone rubber having a group of mercapto compound in a side chain or at a terminal of the silicone rubber A (average particle diameter: 10 μm).

TABLE 3

|  | Example | | | | |
|---|---|---|---|---|---|
|  | 13 | 14 | 15 | 16 | 17 |
| Resin used (wt. %) | 48 | 45 | 40 | 40 | 35 |
| Silica (wt. %) | 50 | 50 | 50 | 50 | 50 |
| Silicone rubber A (wt. %) | 2 | 5 | 10 | — | 15 |
| Silicone rubber B (wt. %) | — | — | — | 10 | — |
| Heat shock test (number of cracks/ | 1/100 | 0/100 | 0/100 | 0/100 | 0/100 |

TABLE 3-continued

| | Example | | | | |
|---|---|---|---|---|---|
| | 13 | 14 | 15 | 16 | 17 |
| number of specimens) | | | | | |
| Young's modulus in flexure (kgf/mm$^2$) | 880 | 760 | 630 | 680 | 500 |
| Coefficient of linear expansion ($\times 10^{-5}$ cm/cm/°C.) | 1.3 | 1.2 | 1.2 | 1.2 | 1.3 |
| Ink immersion test | 0/100 | 0/100 | 0/100 | 0/100 | 0/100 |

Examples 18 and 19

Pellets each having a composition shown in Table 4 were prepared from the liquid crystal polyester resin E in the same manner as that of Example 5 and then a DIP-type 14-pin IC was sealed therewith.

The silicone resin used herein was one prepared by the condensation between methylsilanetriols with elimination of water to form a polymer having a highly developed three-dimensional network and pulverizing it (average particle diameter: 3 μm).

TABLE 4

| | Example | |
|---|---|---|
| | 18 | 19 |
| Resin used (wt. %) | 47 | 50 |
| Silica (wt. %) | 50 | 50 |
| Silicone resin (wt. %) | 3 | 10 |
| Heat shock test (number of cracks/number of specimens) | 0/100 | 0/100 |
| Young's modulus in flexure (kgf/mm$^2$) | 730 | 650 |
| Coefficient of linear expansion ($\times 10^{-5}$ cm/cm/°C.) | 1.3 | 1.3 |
| Ink immersion test | 0/100 | 0/100 |

The liquid crystal polyesters used in the above-described examples were those having the following structural units:

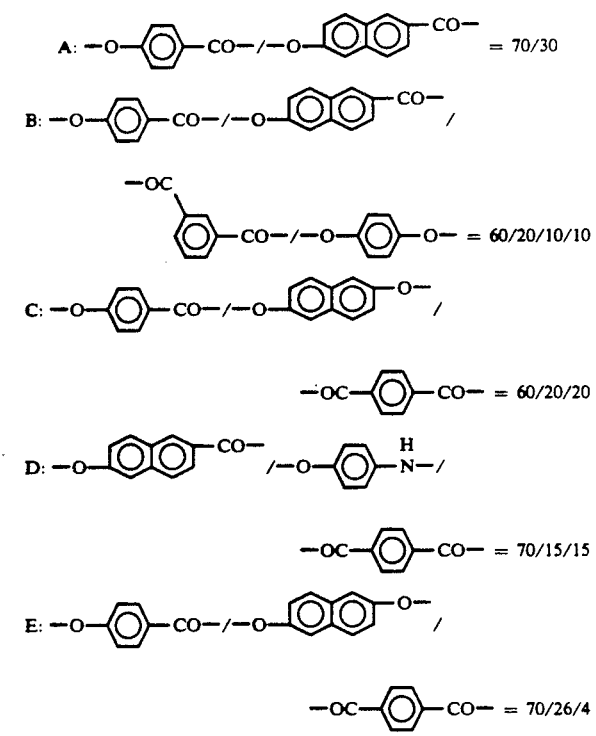

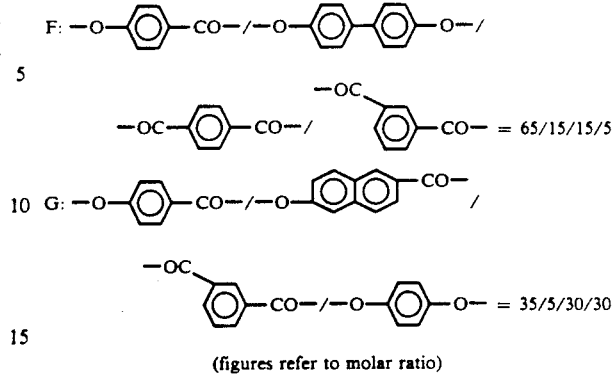

(figures refer to molar ratio)

We claim:

1. An improved method for encapsulating an electronic component so as to seal the surface of the electronic component under low stress conditions with a highly stable protective layer comprising injection molding about the surface of said electronic component an encapsulant composition comprising a molten melt-processable aromatic polyester which is capable of forming an anisotropic melt phase which contains uniformly blended therein an organopolysiloxane selected from the group consisting of a silicone oil in a concentration of 0.1 to 5 percent by weight based upon the total weight of the encapsulant composition, and a silicone rubber in a concentration of 1 to 20 percent by weight based upon the total weight of the encapsulant composition possessing an average particle size of 0.1 to 100 μm, and cooling said anisotropic melt containing said uniformly blended organopolysiloxane selected from the group consisting of said silicone oil, and said silicone rubber to accomplish solidification of the encapsulant composition about the surface of said electronic component.

2. An improved method for encapsulating an electronic component in accordance with claim 1 wherein said melt-processable polyester which is capable of forming an anisotropic melt phase contains at least 10 mole percent of naphthalene units selected from the group consisting of 6-oxy-2-naphthoyl, 2,6-dioxynaphthalene, and 2,6-dicarboxynaphthalene.

3. An improved method for encapsulating an electronic component in accordance with claim 1 wherein said melt-processable polyester which is capable of forming an anisotropic melt phase contains 70 mole percent of 4-oxybenzoyl units and 30 mole percent of 6-oxy-2-naphthoyl units.

4. An improved method for encapsulating an electronic component in accordance with claim 1 wherein said melt-processable polyester which is capable of forming an anisotropic melt phase exhibits an inherent viscosity of at least 1.0 dl./g. when dissolved in a concentration of 0.1 percent by weight in pentafluorophenol at 60° C.

5. An improved method for encapsulating an electronic component in accordance with claim 1 wherein said melt-processable polyester which is capable of forming an anisotropic melt phase exhibits and inherent viscosity of 2.0 to 10.0 dl./g. when dissolved in a concentration of 0.1 percent by weight in pentafluorophenol at 60° C.

6. An improved method for encapsulating an electronic component in accordance with claim 1 wherein said organopolysiloxane is silicone oil and is present in a concentration of 0.1 to 5 percent by weight based upon the total weight of the encapsulant composition.

7. An improved method for encapsulating an electronic component in accordance with claim 6 wherein said silicone oil is a straight chain or partially branched dimethylpolysiloxane.

8. An improved method for encapsulating an electronic component in accordance with claim 1 wherein said organopolysiloxane is silicone oil comprising a straight chain or partially branched dimethylpolysiloxane and is present in a concentration of 0.5 to 2 percent by weight based upon the total weight of the composition.

9. An improved method for encapsulating an electronic component in accordance with claim 1 wherein said organopolysiloxane is silicone rubber and is present in a concentration of 1 to 20 percent by weight based upon the total weight of the encapsulant composition.

10. An improved method for encapsulating an electronic component in accordance with claim 9 wherein said silicone rubber possesses an average particle size of 1 to 20 μm.

11. An improved method for encapsulating an electronic component in accordance with claim 1 wherein said organopolysiloxane is silicone rubber and is present in a concentration of 2 to 15 percent by weight based upon the total weight of the encapsulant composition.

12. An improved method for encapsulating an electronic component in accordance with claim 11 wherein said silicone rubber possesses an average particle size of 1 to 20 μm.

13. An improved method for encapsulating an electronic component in accordance with claim 11 wherein said encapsulant composition further comprises a particulate inorganic filler blended therein.

14. An improved method for encapsulating an electronic component in accordance with claim 13 wherein said particulate inorganic filler is present in said encapsulant composition in a concentration of at least 20 percent by weight based upon the total weight of the composition.

15. An improved method for encapsulating an electronic component in accordance with claim 13 wherein said particulate inorganic filler is present in said encapsulant composition in a concentration of at least 30 percent by weight based upon the total weight of the composition.

16. An improved method for encapsulating an electronic component in accordance with claim 13 wherein said particulate inorganic filler is present in said encapsulant composition in a concentration of 40 to 75 percent by weight based upon the total weight of the composition and the coefficient of thermal expansion of the solidified encapsulant composition is equal to that of said electronic component.

17. An improved method for encapsulating an electronic component in accordance with claim 13 wherein said particulate inorganic filler is selected from the group consisting of heat-conductive metal oxides, metal nitrides, and metal carbides.

18. An improved method for encapsulating an electronic component in accordance with claim 13 wherein said particulate inorganic filler is fused silica.

* * * * *